(No Model.) 8 Sheets—Sheet 1.
D. G. WEEMS.
ELECTRIC RAILWAY SYSTEM.
No. 393,280. Patented Nov. 20, 1888.
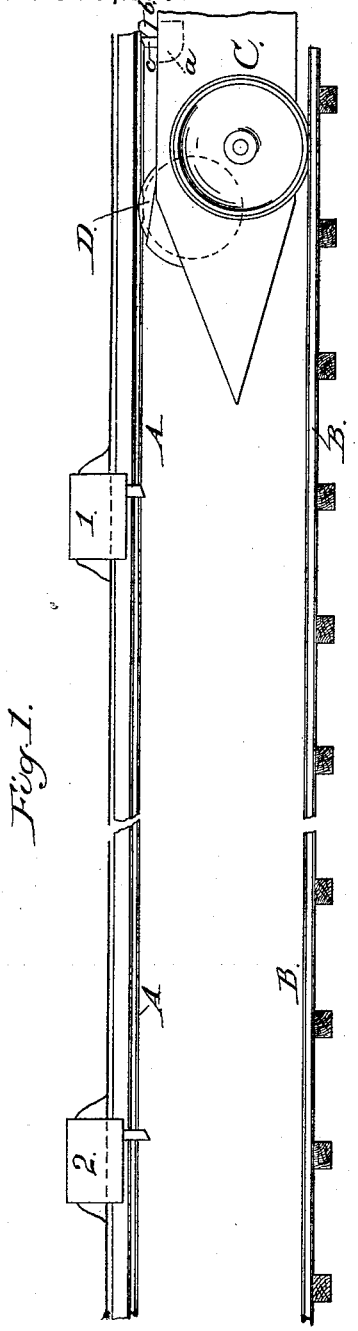
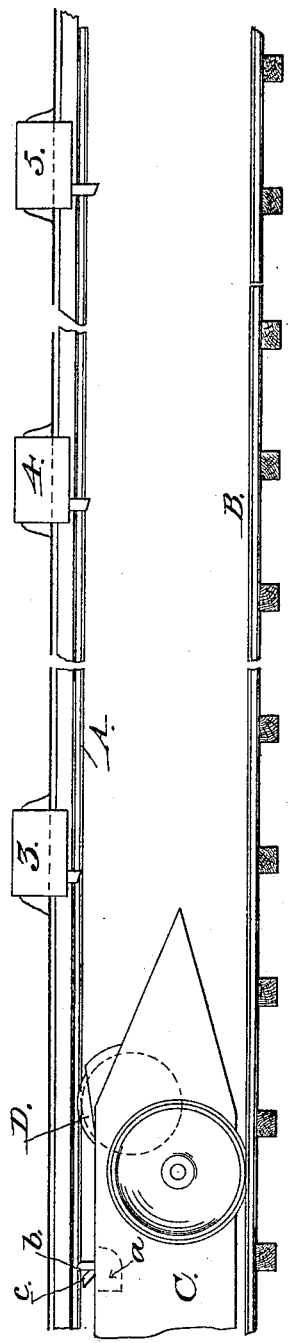
WITNESSES:
INVENTOR,
BY
ATTORNEYS.

(No Model.) 8 Sheets—Sheet 2.
D. G. WEEMS.
ELECTRIC RAILWAY SYSTEM.
No. 393,280. Patented Nov. 20, 1888.
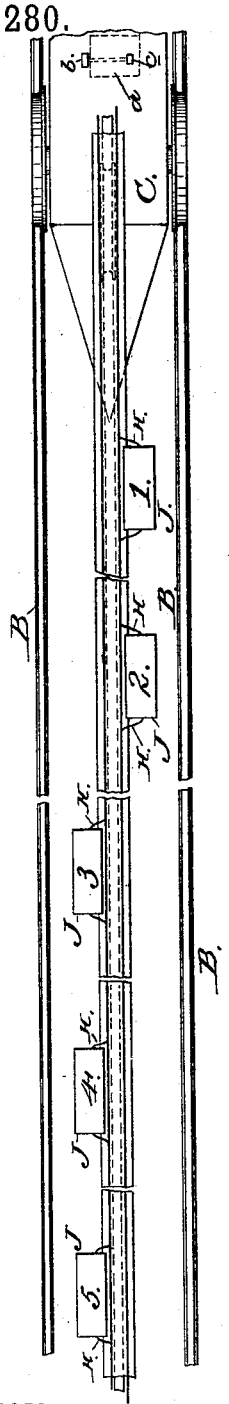
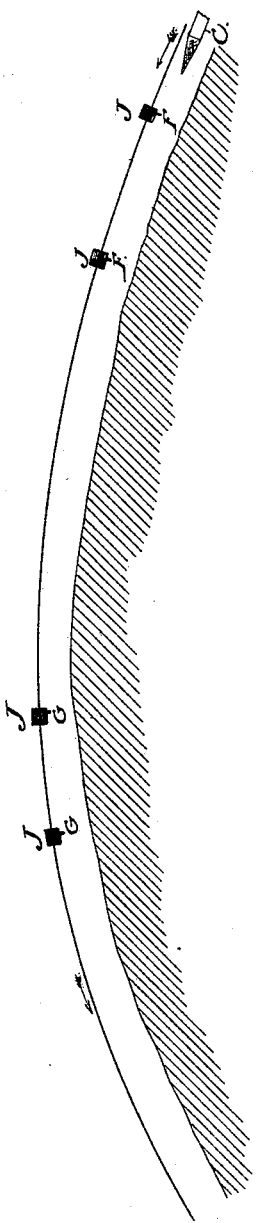
WITNESSES:
INVENTOR.
BY
ATTORNEYS.

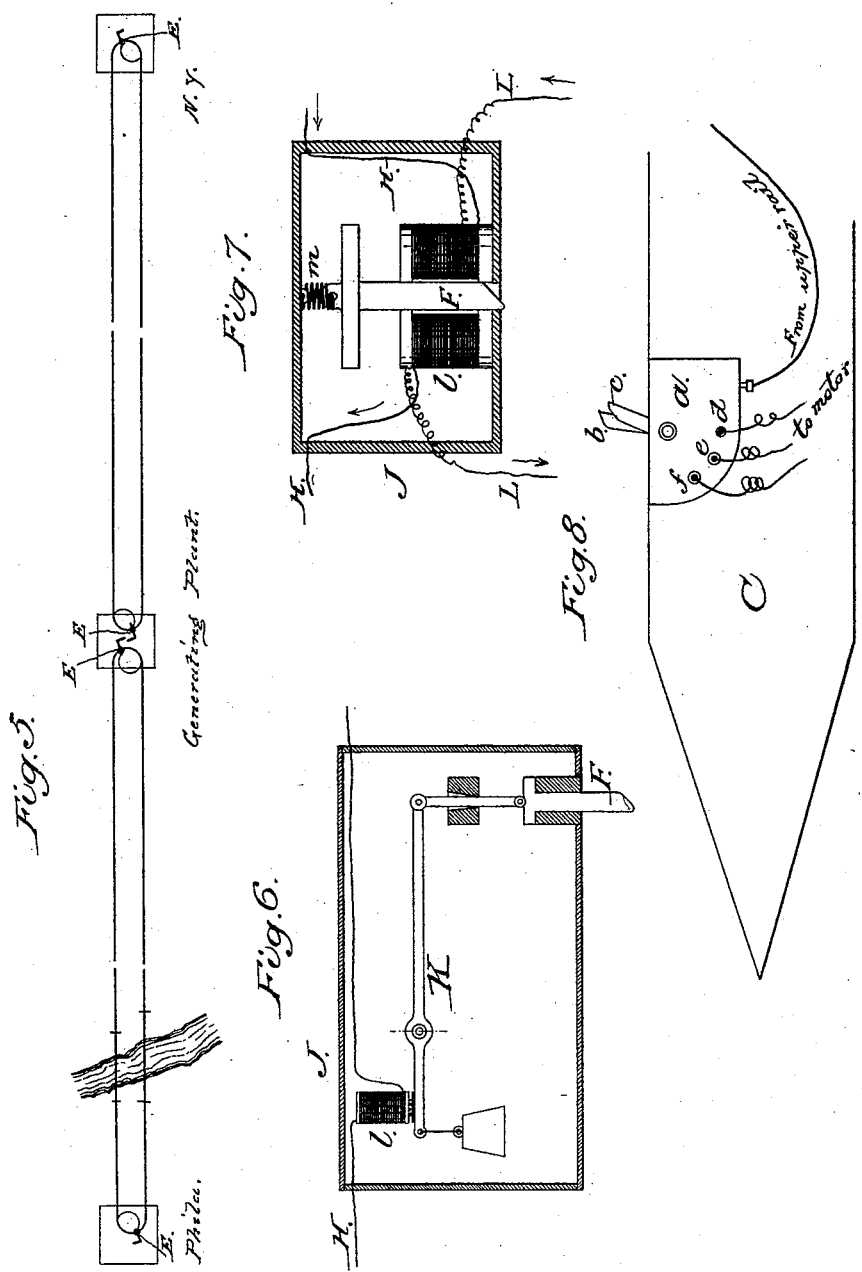

(No Model.)  8 Sheets—Sheet 4.
D. G. WEEMS.
ELECTRIC RAILWAY SYSTEM.
No. 393,280. Patented Nov. 20, 1888.
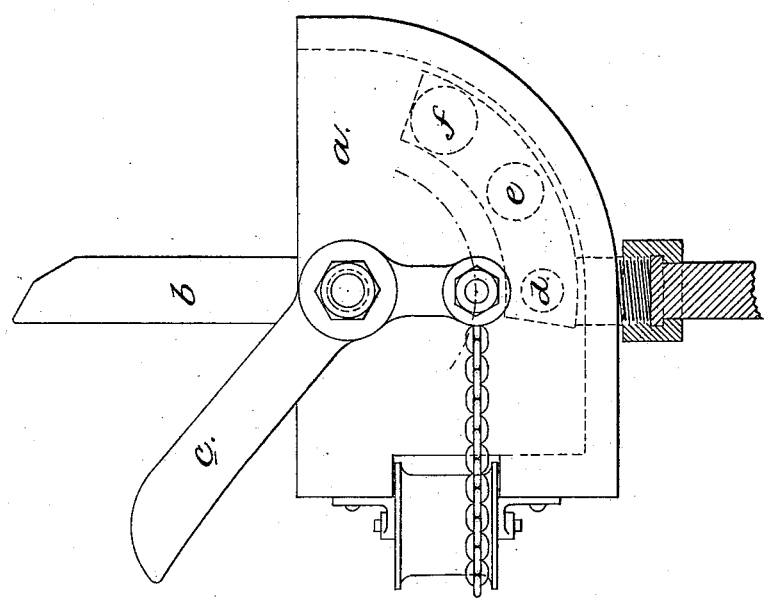
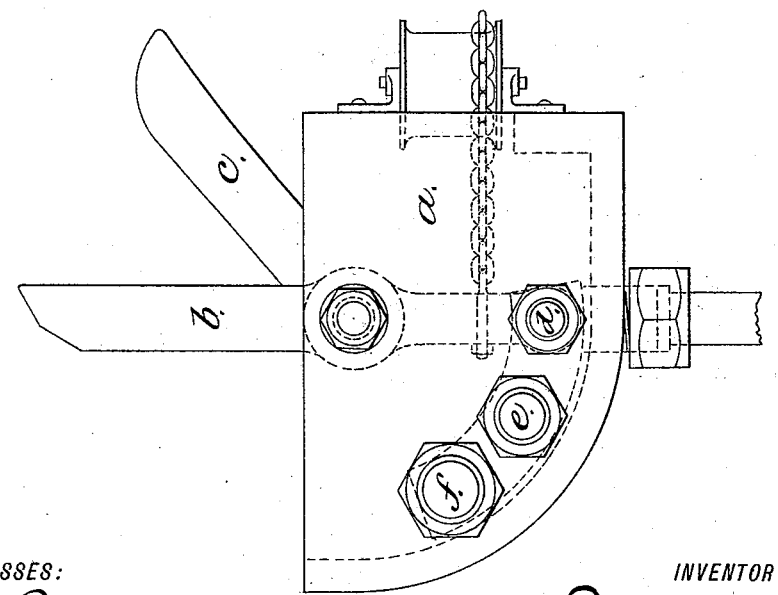
WITNESSES:
Wm W. Pegram.
Benj. J. Dashiell Jr.
INVENTOR,
Daniel G. Weems.
BY
A. H. Evans & Co,
ATTORNEYS.

(No Model.) 8 Sheets—Sheet 5.
D. G. WEEMS.
ELECTRIC RAILWAY SYSTEM.
No. 393,280. Patented Nov. 20, 1888.
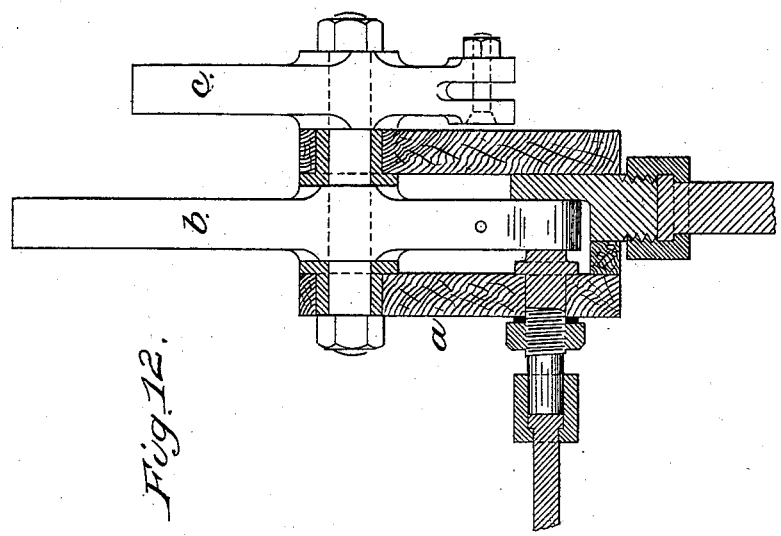
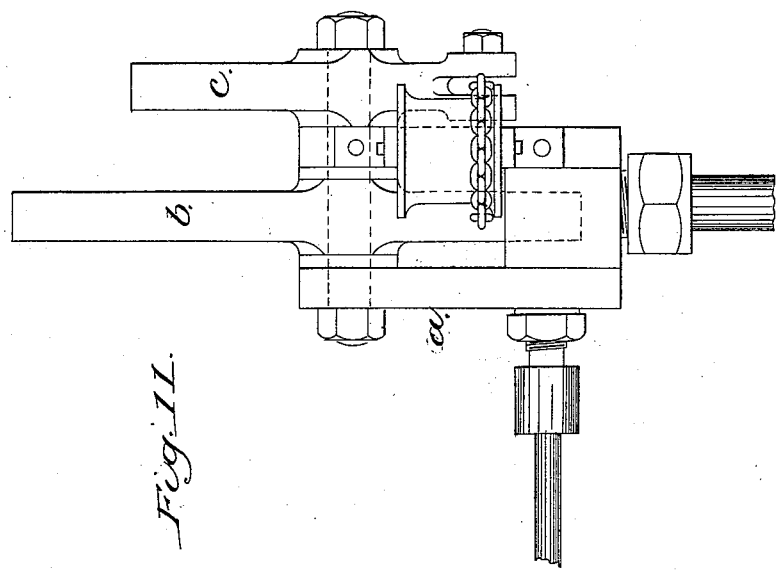
WITNESSES:
INVENTOR.
BY
ATTORNEYS.

(No Model.)  8 Sheets—Sheet 6.
D. G. WEEMS.
ELECTRIC RAILWAY SYSTEM.
No. 393,280.  Patented Nov. 20, 1888.
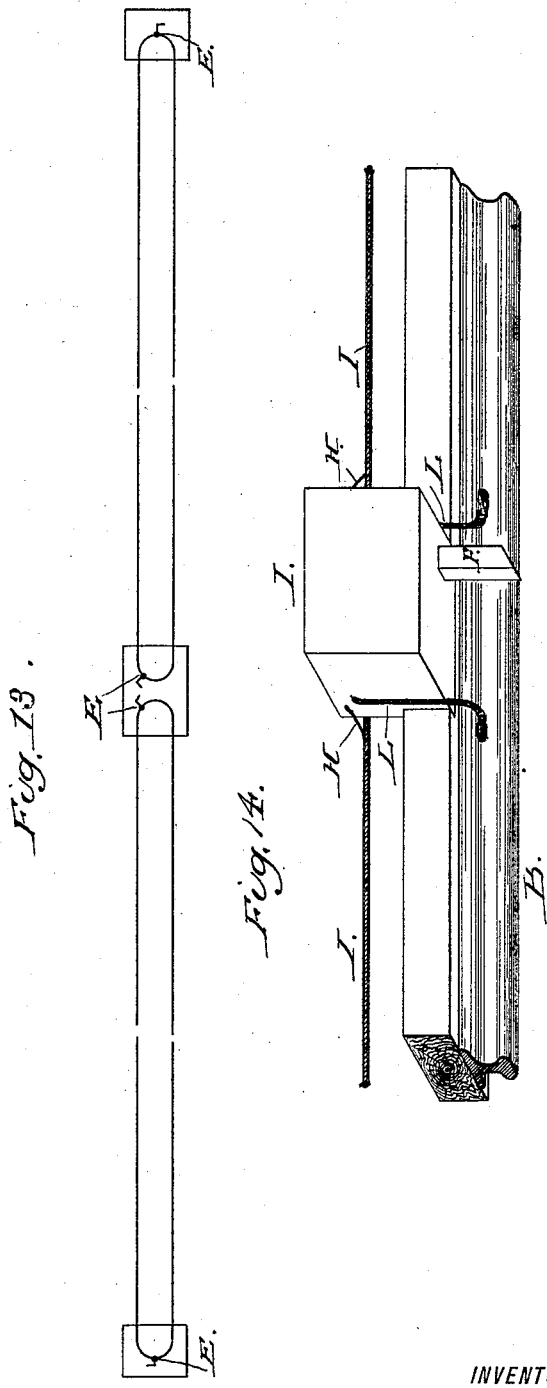
WITNESSES:
INVENTOR,
BY
ATTORNEYS.

(No Model.) 8 Sheets—Sheet 7.
D. G. WEEMS.
ELECTRIC RAILWAY SYSTEM.
No. 393,280. Patented Nov. 20, 1888.
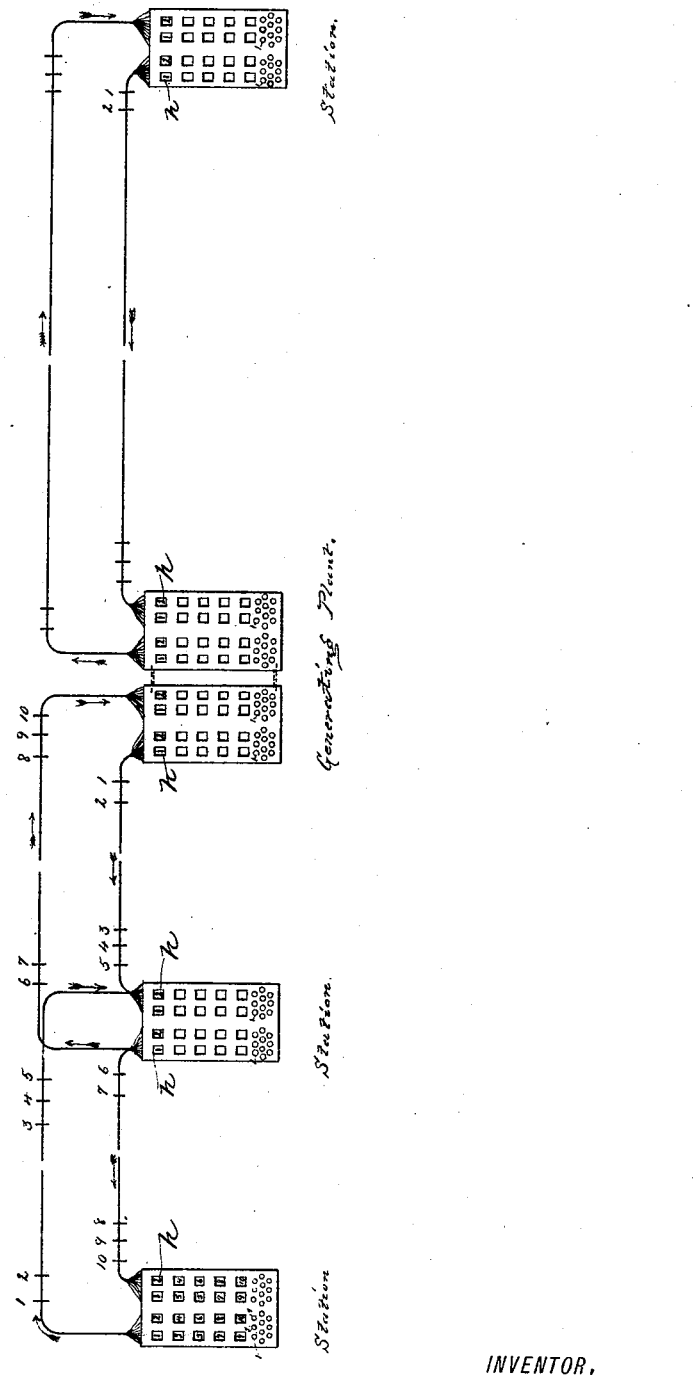
WITNESSES:
INVENTOR,
BY
ATTORNEYS.

(No Model.)  8 Sheets—Sheet 8.
D. G. WEEMS.
ELECTRIC RAILWAY SYSTEM.
No. 393,280. Patented Nov. 20, 1888.
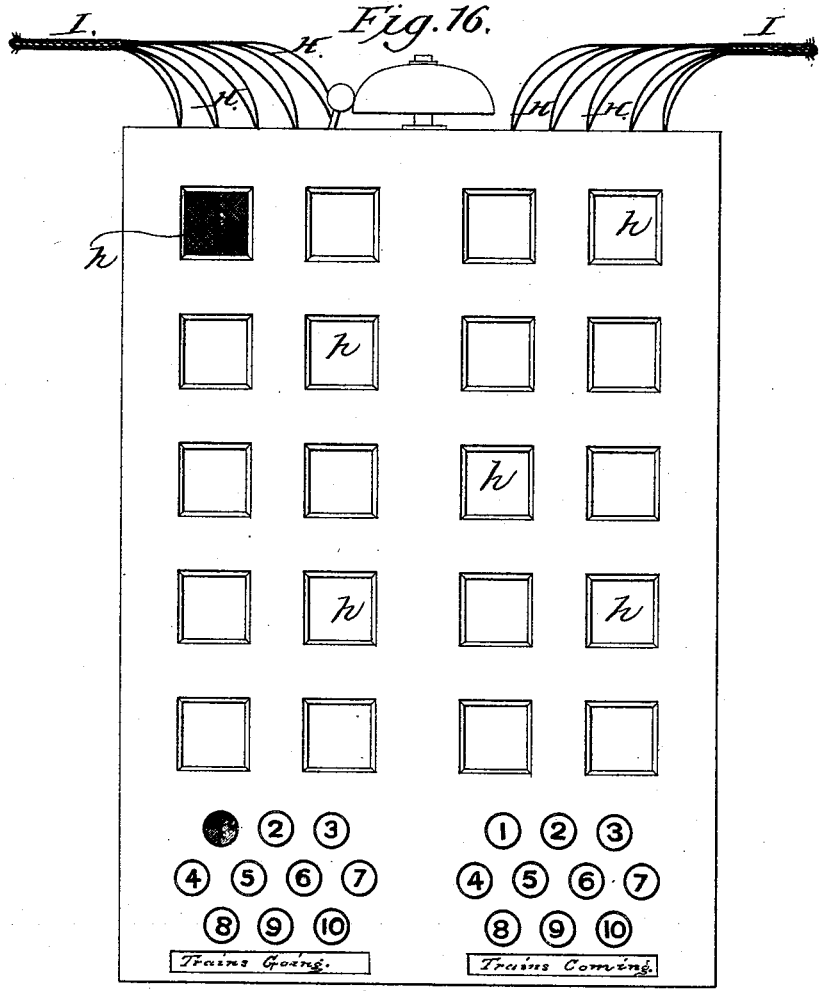
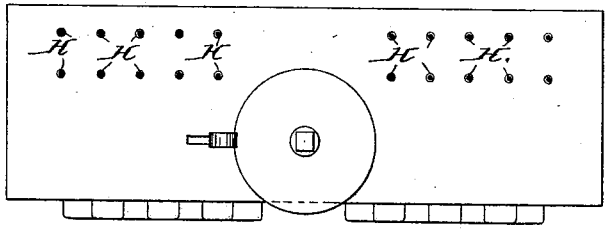
WITNESSES:
INVENTOR,
ATTORNEYS.

UNITED STATES PATENT OFFICE.

DAVID G. WEEMS, OF BALTIMORE, MARYLAND, ASSIGNOR TO THE ELECTRO-AUTOMATIC TRANSIT COMPANY OF BALTIMORE, OF MARYLAND.

ELECTRIC-RAILWAY SYSTEM.

SPECIFICATION forming part of Letters Patent No. 393,280, dated November 20, 1888.

Application filed June 11, 1888. Serial No. 276,667. (No model.)

*To all whom it may concern:*

Be it known that I, DAVID G. WEEMS, a citizen of the United States, residing at Baltimore city, State of Maryland, have invented certain new and useful Improvements in Electric-Railway Systems, of which the following is a full and clear description, reference being had to the accompanying drawings, forming part of this specification, in which—

Figure 1 represents a section of the line of road, showing in elevation the adjustable stops, the wires connecting them with the upper rail, and the front portion of a car having the levers which are actuated by the stops. Fig. 2 is a similar view looking toward the opposite side. Fig. 3 is a plan view of Fig. 1. Fig. 4 illustrates the line passing over a hill, and showing the stops by which the levers on the cars are actuated to increase or decrease the amount of current passing to the motor on the locomotive. Fig. 5 is a diagram showing the terminals of the road, the intermediate generating plant or plants, and suitable keys for cutting off the current from the line. Fig. 6 is a sectional view of a housing, showing an electro-magnet therein, a pivoted weighted lever actuated thereby, and a stop connected with the lever and adapted to be raised or lowered by the current passing through the magnet. Fig. 7 illustrates a modified form of stop. Fig. 8 illustrates the front portion of a car or locomotive, showing the two levers which are actuated by the stops on the line of road for automatically starting, controlling, and stopping the train. Fig. 9 is an enlarged view of the levers with the housing, contact-points, connections, &c. Fig. 10 is a similar view from the opposite side. Fig. 11 is a rear view of said levers, housings, and connections. Fig. 12 is a sectional view of the same. Fig. 13 is a view similar to Fig. 5, showing the keys by which the current may be entirely removed from one section of road without affecting the adjoining section. Fig. 14 is an enlarged detail showing a section of the upper rail, one of the adjustable stops and its housing, the cable for conveying the current to the stops, and wires leading from the upper rail to said stop, whereby the latter is operated by the current from the said rail. Fig. 15 illustrates indicating apparatus at the several stations and generating plant, wires connecting said stations and plant, and the stops for actuating the levers on the train. Fig. 16 illustrates an enlarged view of one of the indicators. Fig. 17 is a plan view of the same.

My present invention relates to certain additional improvements in electric-railway systems for transporting mail, express-packages, &c., at a high rate of speed over a line of elevated, surface, or underground tracks or rails, using as a motive power electricity, having the motor or motors located in a traveling car or locomotive to which a train of cars is attached, the said train being supplied with means for controlling, starting, and stopping itself.

The object of my present invention is to improve the system illustrated and described in my former patent, No. 376,567, granted to me January 17, 1888, on which and the application, Serial No. 276,124, filed by me June 5, 1888, the present constructions are improvements; and my invention consists in the combinations and constructions which I shall hereinafter fully describe and claim.

To enable others skilled in the art to which my invention appertains to make and use the same, I will now describe its construction and indicate a preferred manner of carrying the same out.

In the said drawings, A represents the electrically-charged upper guide-rail; B, the bearing-rails; and C represents the locomotive or one of the cars of the train, which is adapted to receive the mail, express-packages, &c., said locomotive or car having one or more guide-wheels, D, which pick up the current from the guide-rail and transfer it to the motor on the locomotive in a manner similar to that described and shown in my application, Serial No. 276,124, filed June 5, 1888. In addition to these features, the locomotive and cars are provided with housings a, having the pivoted levers b and c and graded contacts d, e, and f, which are arranged as shown in my said application, to transfer the electric current from the upper rail to the motor in increased or reduced quantities to regulate the speed of the train, the said levers being actuated by suitable stops on the line of road in a manner I will now describe. The stops are preferably arranged on opposite sides of the upper rail, as shown more particularly in Fig. 3, and they lie in the path of the levers b and c and at desired points, so as to trip said levers to accelerate or check the speed of the train or stop the train by shutting off the current from the motor, and thereby causing suitable brake mechanisms with which the train is supplied to be applied. Various methods may be adopted for accomplishing these important features, and I may obtain the desired results by entirely removing the current from the upper rail, in which case, the motive power being removed from the motor, the train gradually lessens its speed and finally stops; or I may transmit to the upper rail and from thence to the motor enough current to drive the train at a low rate of speed or at a high speed, as desired.

To make this part of my invention more plain, I will refer to Fig. 5, where I have illustrated the terminals of the road, with one or more generating plants placed intermediate of said terminals, whereby the road is divided practically into sections or divisions, the two terminals being electrically connected with a stationary dynamo or other source of electric energy at those points. Now it will be observed that if a train is in motion on that section of the road between the station marked "N.Y." and the generating plant, and the operator at the said station wishes to reduce its speed, he will so manipulate the key E at the station that only a portion of the main current passes through the key and out onto the line, passing through the upper guide-rail and thence to the train, as previously described, the remaining portion of the current being conveyed back to the dynamo in any well-known manner. When the operator wishes the train to travel at a higher rate of speed, he accordingly adjusts the key E and permits as much of the current to pass to the upper rail as will drive the train at the speed desired, and should he at any time wish to stop his train he will operate the key so as to break the connection of the upper rail with the dynamo or source of power, and by that means entirely cut off the power from the train, which enables the latter to come to a standstill in a short while. It will thus be seen that by the manipulation of the key, which may be of any well-known construction, the operator controls the amount of current passing to the upper rail, and thereby controls the speed of the train or stops it, the said train being again started and its speed increased by again moving the key to permit the current to pass to the upper rail and train in desired quantities. The other terminal—marked in the drawing "Phila."—is also provided with a key E, by which the operator at that point controls the train upon his section or division of the road, and at the generating plant the ends of the two sections may likewise be provided with keys, which are actuated by an operator at that point, who, by the aid of any well-known indicating apparatus, knows the positions and has control of the trains upon both divisions of the road, and may stop the trains or regulate their speed at pleasure or as the circumstances require.

At the generating plant the two ends of the divisions of the road may be connected in any suitable manner to permit the train on one division to readily pass onto the other division and continue its journey under the control of the operators at the generating plant and end of the line where the train is to finally stop.

Instead of controlling the amount of current passing onto the upper guide-rail, I may permit the full current to enter the rail, and then "take off" of the same at predetermined times as much of the current as desired. In such cases I prefer to employ the system of stops previously noted and arrange them so that they will trip the levers on the locomotive and cars and cause said levers, in connection with graded contacts similar to those described and claimed in my application of June 5, 1888, to transmit the current from the upper rail to the motor in any desired amount. These stops F and G will be located at suitable points along the road and in the path of the levers b and c, and they will each be connected with a wire, H, forming part of the cable I, to which a secondary current may be conveyed in any suitable manner and from any desired source, and each stop will by preference be numbered to correspond with a numbered plate, h, forming part of a suitable annunciator in the operator's room at the stations and the generating plants, if desired, so that when any of the stops on the road are operated the annunciators in the several stations and at the generating plant indicate the stop that has been operated and enables the operators at the other stations to control their trains accordingly. When the stops are employed, I will arrange them in suitable housings, J, along the line of road, each of which contains an electro-magnet, l, that is connected with one of the wires H of the cable I, which is connected with a numbered push-button at the stations and corresponding with the number of the stop, so that when the button is depressed the current with which the cable is connected will pass through the wire to its magnet l, and this secondary current, combined with that portion of the main current which is taken from the conducting-rail by means of the wires L, energizes the magnet and attracts an armature on the short arm of a weighted lever, K, as shown in Fig. 6, causing the long arm of the lever, which carries the stop, to be thrown downward. This movement of the lever projects the stop F through an opening in the housing J and holds it in a position where it may be struck by one of the levers on the locomotive or car to cause said lever to be moved with relation to the graded contacts *d e f*, (shown in Figs. 9 to 12, inclusive,) so as to increase or decrease the amount of current passing from the upper rail to the motor, and thus regulate the speed of the train. The operation and construction of the levers and graded contacts are fully set out in my former application of June 5, 1888; but I have illustrated them in this case to show their connection with electrically-operated stops.

Instead of the stop shown in Fig. 6, I may, if desired, use the modified construction shown in Fig. 7, where the said stop is provided with an armature which is attracted by a magnet *l*, in the lower part of the housing, whereby when the combined currents from the rail B and wires or conductors H energize the magnet the armature is drawn downward and the stop projected through an opening in the housing, as before stated. In this case, however, I connect the stop with a spring, *m*, of sufficient strength to overcome the resistance of the current from the rail B when the secondary current through wire H is cut off, and this spring draws the stop upward into the housing when the push-button is released and the current removed from the wire H. The current which passes through the individual wires H of the cable I need only be strong enough, combined with that portion of the main current passing through the wires L to energize the magnets, to attract the armatures attached to the stops and cause them to contact with the magnet, for when the connection is made between these parts the magnets will be energized, the armatures will be attracted toward them, and the stops will be securely held in position for engagement with the levers *b* and *c*. This construction I have shown in the detail Fig. 14, and it constitutes a very desirable method of utilizing a portion of the main current for holding the stops in position.

Fig. 4 illustrates the road passing over a hill, in which case it will be desirable to locate certain of the stops F at the base of the hill, so that they may trip the levers on the car or locomotive and impart increased speed to the latter, while at the summit of the hill I will locate other stops, G, which will be arranged in the path of the other lever, *c*, whereby when the latter is tripped by the stops G a less amount of current passes from the guide-rail, and thereby causes the train to slacken its speed during its descent, the stops and levers being actuated in the manner previously described.

In Figs. 15, 16, and 17 I illustrate several stations and generating plants connected together, and each provided with annunciators having numbers corresponding with the stops, so that when the operator at any one of the points named adjusts any one of the stops its corresponding number is displayed in the other stations and advises the operator therein of the condition of the road.

In Fig. 15 the stops marked 1 2 6 7 indicate those which are operated to start the train, while those numbered 3 4 5 8 9 10 indicate those which are set to check the progress of the train or stop it entirely, as more fully disclosed in my said application previously mentioned, it being understood that these stops may be located at or near the starting-points or along the road at such points somewhat in advance of the intermediate station where the train is to stop.

The indicator shown in Figs. 16 and 17 illustrates the push-buttons having numbers corresponding with the stops, and shows the individual wires H, which lead thereto, the said indicating apparatus having also a bell, which signals the applying of any of the stops on the line.

Having thus described my invention, what I claim as new, and desire to secure by Letters Patent, is—

1. In an electric-railway system, the combination of bearing-rails, an upper guide-rail, a locomotive having a motor in electric connection with said rail, and cars attached to the locomotive and adapted to contain mail, express-packages, &c., trip-levers and graded contacts on the locomotive or cars, and a series of electrically-operated stops on the line of road for tripping the levers and regulating the speed of the train, and an indicating apparatus at the stations and connected with the stops, whereby the latter are operated, substantially as described.

2. In an electric-railway system for transporting mail and packages, a locomotive and train of cars, the upper guide-rail, and the lower bearing-rails, in combination with an indicating apparatus at the stations, comprising drop-plates and push-buttons, and connections between the indicating apparatus and suitable stops on the line of road, whereby the stops may be actuated from any of the stations and the adjusted stop indicated at the remaining stations, substantially as described.

3. In an electric-railway system for transporting mail, express-packages, &c., the upper and lower rails, the locomotive and train of cars, and means for conveying the current from the upper rail to the locomotive in predetermined quantities, in combination with a series of electrically-operated stops on the line of road, an indicating apparatus connected with each stop, a secondary current for affecting a preliminary movement of the stops, and connections between the upper electrically-charged rail and the stops, whereby said stops are held in position by the main and secondary currents, substantially as herein described.

4. In an electric-railway system for transporting mail, express-packages, &c., the upper and lower rails, the locomotive and train of cars, one or more generating plants between the terminals of the road, keys or equivalent devices at said terminals, and generating plants for controlling the current passing to the upper rail, and adjustable stops electrically operated from said terminals and generating plant, whereby the speed of the train is regulated, substantially as described.

5. In an electric-railway system for transporting mail, express-packages, &c., the combination, with upper and lower rails and a locomotive having a motor and tripping-levers, of a series of obstructions in the path of the levers, said obstructions comprising a suitable housing, an electro-magnet and adjustable stop having an armature connected therewith, and a counterpoise for returning the stop to its normal position when the current is removed from the magnet, substantially as described.

DAVID G. WEEMS.

Witnesses:
BENJ. J. DASHIELL, Jr.,
JAMES G. REICH.